US012677978B2

(12) United States Patent
Cailleton

(10) Patent No.: US 12,677,978 B2
(45) Date of Patent: Jul. 14, 2026

(54) SMALL MANUAL COFFEE MAKER

(71) Applicant: HUA KU (SHUNDE) TECH ELECTRIC CO., LTD, Foshan (CN)

(72) Inventor: Hugo Yves Lucien Cailleton, Foshan (CN)

(73) Assignee: HUA KU (SHUNDE) TECH ELECTRIC CO., LTD, Foshan (CN)

( * ) Notice: Subject to any disclaimer, the term of this patent is extended or adjusted under 35 U.S.C. 154(b) by 1093 days.

(21) Appl. No.: 17/777,902

(22) PCT Filed: Jan. 13, 2022

(86) PCT No.: PCT/CN2022/071762
§ 371 (c)(1),
(2) Date: May 18, 2022

(87) PCT Pub. No.: WO2022/152197
PCT Pub. Date: Jul. 21, 2022

(65) Prior Publication Data
US 2023/0240464 A1     Aug. 3, 2023

(30) Foreign Application Priority Data

Jan. 14, 2021     (CN) .......................... 202110048195.7

(51) Int. Cl.
*A47J 31/00*         (2006.01)
*A47J 31/36*         (2006.01)
(Continued)

(52) U.S. Cl.
CPC ......... *A47J 31/005* (2013.01); *A47J 31/3666* (2013.01); *A47J 31/38* (2013.01); *A47J 31/4407* (2013.01); *A47J 31/461* (2018.08)

(58) Field of Classification Search
CPC ...... A47J 31/005; A47J 31/3666; A47J 31/38; A47J 31/4407; A47J 31/461; A47J 31/24; A47J 31/4403
(Continued)

(56) References Cited

U.S. PATENT DOCUMENTS 6,129,006 A * 10/2000 Schmed ............... A47J 31/3609
99/287
2018/0125286 A1* 5/2018 Samsó Besora ........ A47J 31/36

FOREIGN PATENT DOCUMENTS

CN        103654412 A      3/2014
CN        203506413 U      4/2014
(Continued)

OTHER PUBLICATIONS

Mar. 31, 2022 International Search Report issued in International Patent Application No. PCT/CN2022/071762.
(Continued)

*Primary Examiner* — Topaz L. Elliott
*Assistant Examiner* — Daniel Ward Hatten

(57)            ABSTRACT
A small manual coffee maker includes: a cup body and detachable coffee brewing base. A body lower end is connected to the base. Water and pressure chambers are in the body. A coffee brewing chamber and coffee outlet passage are in the base. The body has a water inlet passage communicating with the pressure chamber and a water outlet passage communicating with the pressure and coffee brewing chambers. A water chamber bottom has a water inlet communicating with the water inlet passage. The water inlet passage has a water inlet one-way valve which can control the one-way flow of water from the water inlet passage to the pressure chamber. The water outlet passage has a water outlet one-way valve which can control the one-way flow of water from the pressure chamber to the coffee brewing chamber. The body has a piston rod with one end extending into the pressure chamber.

9 Claims, 7 Drawing Sheets

(51) Int. Cl.
    *A47J 31/38*         (2006.01)
    *A47J 31/44*         (2006.01)
    *A47J 31/46*         (2006.01)

(58) Field of Classification Search
    USPC ........................................................ 99/302 P
    See application file for complete search history.

(56)                  References Cited

FOREIGN PATENT DOCUMENTS

| | | | |
|---|---|---|---|
| CN | 205458091 | U | 8/2016 |
| CN | 106724821 | A | 5/2017 |
| CN | 206390776 | U | 8/2017 |
| CN | 108371483 | A | 8/2018 |
| CN | 208909814 | U | 5/2019 |
| CN | 211525045 | U | 9/2020 |
| CN | 112716289 | A | 4/2021 |
| TW | M522677 | U | 6/2016 |
| WO | 2011/101712 | A1 | 8/2011 |

OTHER PUBLICATIONS

Mar. 31, 2022 Written Opinion issued in International Patent Application No. PCT/CN2022/071762.
Extended European search report issued in corresponding European application No. 22725153.5 dated Jun. 19, 2023.

\* cited by examiner

SMALL MANUAL COFFEE MAKER

TECHNICAL FIELD

The invention relates to a small manual coffee maker.

BACKGROUND ART

The inventor has developed a portable coffee maker with a patent number of CN201310345121.5. This coffee maker is small in size and convenient to carry, and is popular among consumers. This product is a three-section structure, which comprises a cup body, a water-pressing base body and a coffee brewing base body that are detachably connected together. When manually brewing coffee, the cup body is on the top with the opening of the cup body facing down and installed at the upper end of the water-pressing base body, in this way, when we pour the water into the water cup, we need to put the opening of the cup body upward, after filling the water, the water-pressing base body is turned upside down and installed with the water cup first, at this time, the water cup is at the lower end, and then turn around to put the water cup at the upper end. This operation process may be somewhat cumbersome, which will bring certain inconvenience to users. The inventor has made improvements based on this defect.

SUMMARY OF THE INVENTION

The purpose of the invention is to overcome the deficiencies of the prior art and provide a small manual coffee maker with simple structure and convenient use.

In order to solve the above problems, the invention adopts the following technical solutions.

A small manual coffee maker, comprising a cup body and a coffee brewing base that are detachably connected together, a lower end of the cup body is connected to the coffee brewing base, a water chamber and a pressure chamber are disposed in the cup body, a coffee brewing chamber and at least a coffee outlet passage are disposed in the coffee brewing base, the cup body is provided with at least a water inlet passage that communicates with the pressure chamber and at least a water outlet passage that communicates with the pressure chamber and the coffee brewing chamber, a bottom of the water chamber is provided with at least a water inlet in communication with the water inlet passage, the water inlet passage is provided with a water inlet one-way valve which can control the one-way flow of water from the water inlet passage to the pressure chamber, the water outlet passage is provided with a water outlet one-way valve which can control the one-way flow of water from the pressure chamber to the coffee brewing chamber, the cup body is provided with a piston rod with one end extending into the pressure chamber.

In the small manual coffee maker, the height of the water inlet is lower than or equal to the height of the pressure chamber.

In the small manual coffee maker, the water inlet passage and the water outlet passage are located below the pressure chamber.

In the small manual coffee maker, a bottom end of the cup body connected with the coffee brewing base is provided with at least a communication groove in communication with the water inlet and the water inlet passage, a lower end of the communication groove is opened, the water inlet one-way valve is installed into the water inlet passage from an opening at the lower end of the communication groove, the bottom end of the cup body is provided with a mounting cover that covers the opening at the lower end of the communication groove.

In the small manual coffee maker, the water inlet one-way valve comprises a valve body disposed in the water inlet passage and supported by the mounting cover, the valve body is provided with a valve body hole, and the water inlet passage is provided with a water inlet valve core that can block the valve body hole.

In the small manual coffee maker, one end of the water inlet passage is provided with a water inlet communication hole in communication with the pressure chamber, the water inlet valve core is spherical, and the water inlet communication hole is located above the water inlet valve core and is a square hole.

In the small manual coffee maker, one end of the water outlet passage is provided with a water outlet communication hole in communication with the water chamber, the bottom end of the cup body connected with the coffee brewing base is provided with a sink, the water outlet passage and the communication groove are located on a bottom wall of the sink, the mounting cover is fixed in the sink, the mounting cover is provided with a sealing head with one end extending into the communication groove to seal between the communication groove and the sink, the mounting cover is provided with at least a water outlet in communication with the water outlet passage and the coffee brewing chamber, the water outlet one-way valve comprises a first elastic member supported by the mounting cover, an upper end of the first elastic member is provided with a water outlet valve core that can block the water outlet communication hole.

In the small manual coffee maker, an lower end of the cup body is provided with a connection opening connected with the coffee brewing base, the cup body is provided with a valve base that separates the connection opening and the water chamber, the pressure chamber, the water inlet passage and the water outlet passage are all arranged on the valve base.

In the small manual coffee maker, the valve base and the cup body are integrally formed.

In the small manual coffee maker, an upper end of the valve base is provided with a pressure relief groove, at least a pressure relief passage and at least a pressure relief hole which are communicated in sequence, an open end of the pressure relief groove is in communication with the water chamber, the pressure relief hole is in communication with the pressure chamber, the pressure relief passage is provided with a pressure relief valve core for blocking the pressure relief hole and a second elastic member elastically pressed on the pressure relief valve core, the pressure relief groove is provided with a pressure relief cover pressed against the second elastic member and an end cover pressed against the pressure relief cover to cover the opening of the pressure relief groove.

In the small manual coffee maker, an upper end of the cup body is provided with at least an opening, the cup body is provided with a cup lid that covers the opening of the cup body.

The beneficial effects of the invention are:
1. The pressure chamber, the water inlet passage and the water outlet passage are all arranged on the cup body, and the part that generates the hydraulic power is assembled on the cup body. When in use, the water can be directly poured into the water chamber for use, so that the upside down process is not required, and it becomes a two-end connection, which can reduce the volume of the coffee maker under the same water capacity.

2. The water inlet passage and the water outlet passage are both located below the pressure chamber, that is, the water inlet passage and the water outlet passage are located on the same side, so that there is no need to reserve a space for the water inlet passage above the pressure chamber, and the height below the pressure chamber occupied by the water inlet passage and the water outlet passage is roughly the same, and the structure is compact, which can reduce the space occupied by the pressure generating mechanism.

3. By setting a communication groove at the bottom end of the cup body, when the mounting cover is opened, both the water inlet passage and the water outlet passage will be exposed, so that the water inlet one-way valve and the water outlet one-way valve can be installed through the communication groove, which is simple to install and convenient to disassemble and wash.

4. The valve base and the cup body are integrally formed, which can greatly reduce the volume of the entire coffee maker. The structure is simple, the installation is convenient, and the volume is small.

DETAILED DESCRIPTION OF THE INVENTION

Figure 1:
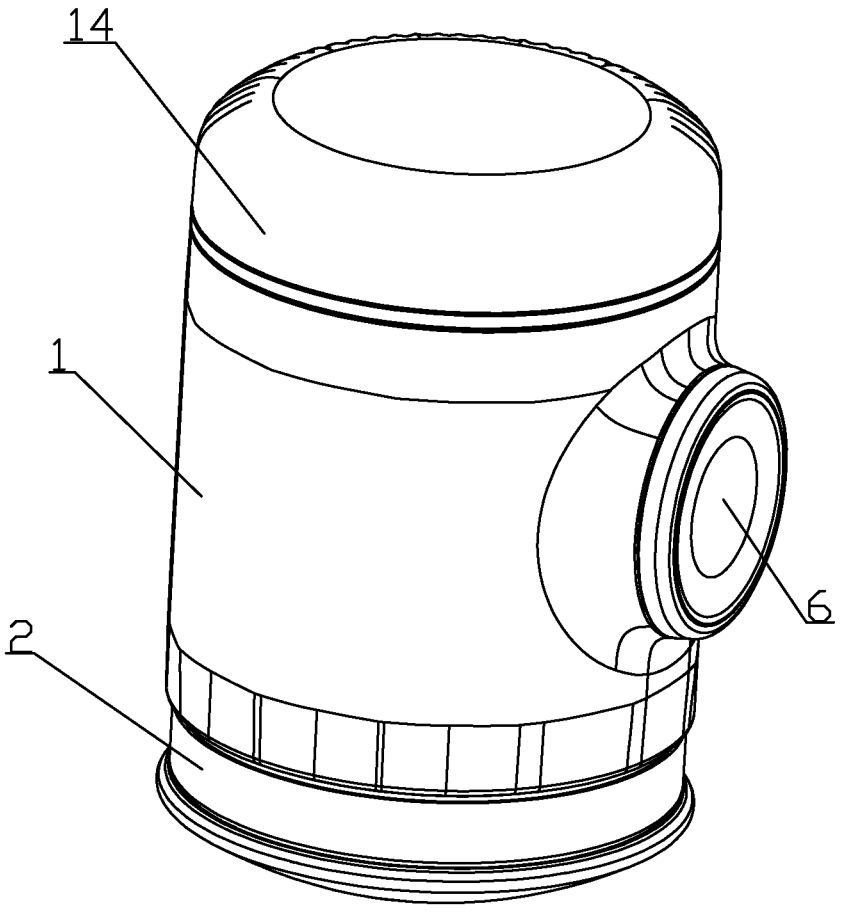
FIG. 1 is a perspective view of the invention.
Figure 2:
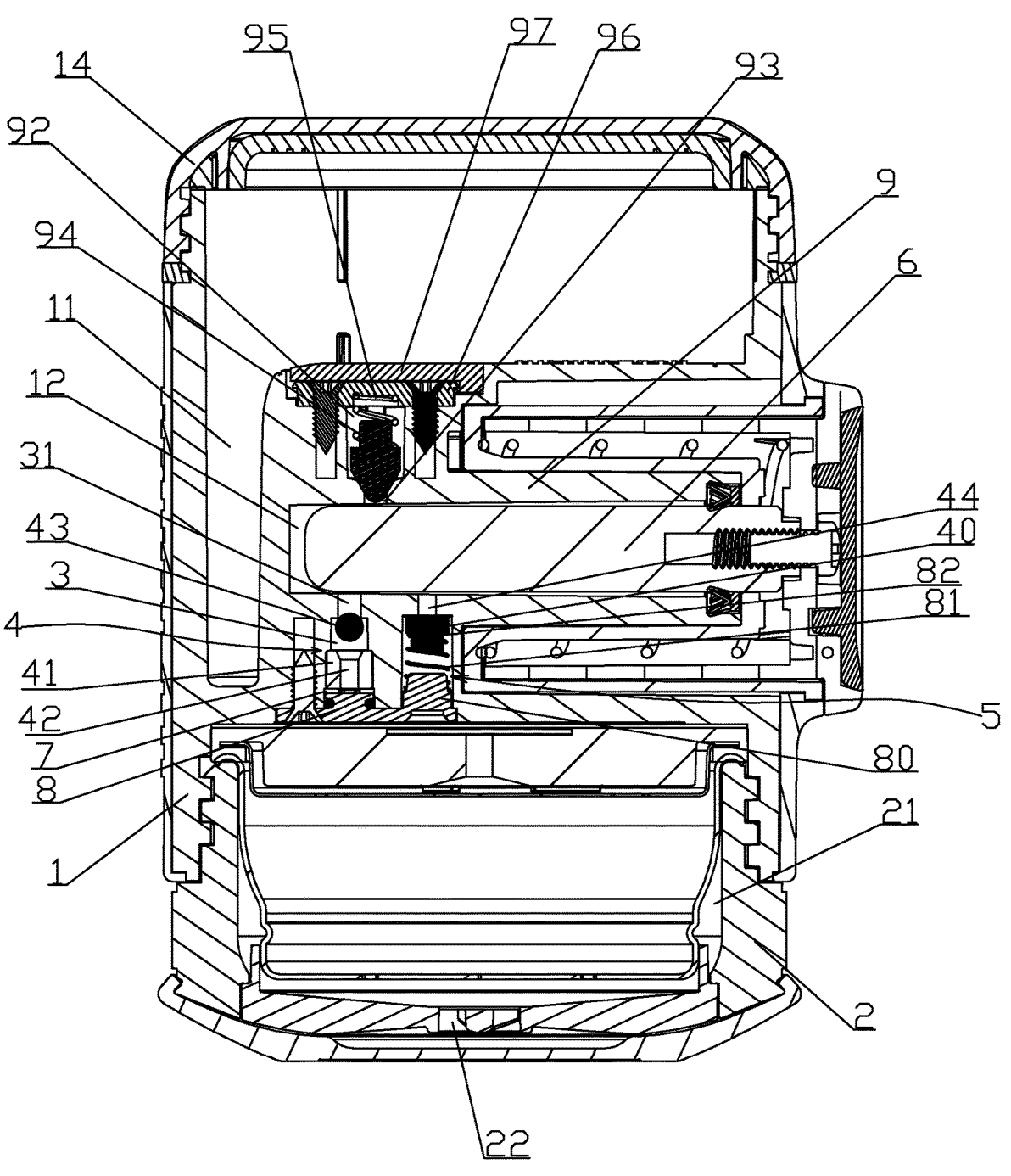
FIG. 2 is a section view of the invention.
Figure 3:
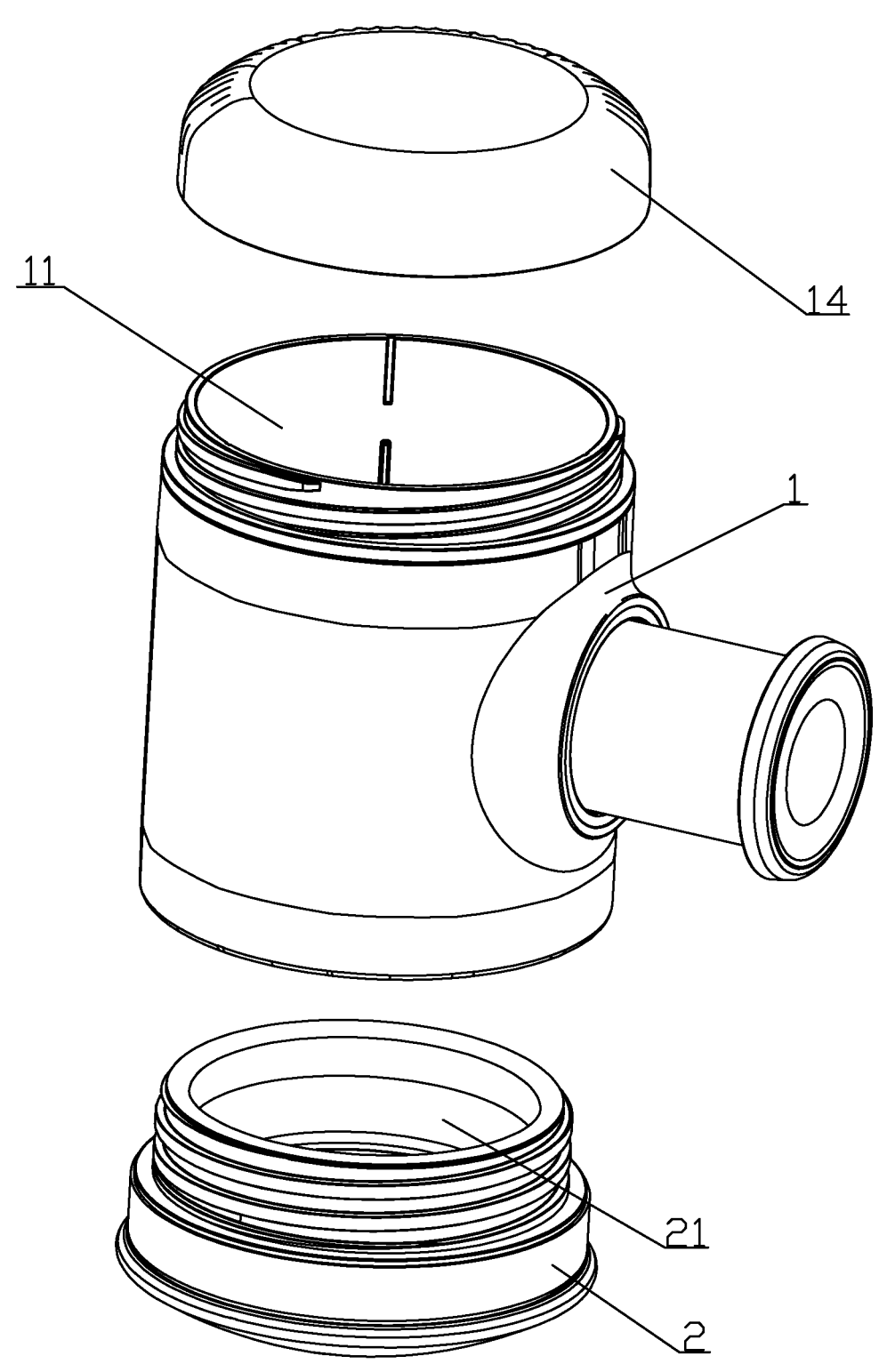
FIG. 3 is a partial exploded view of the invention.
Figure 4:
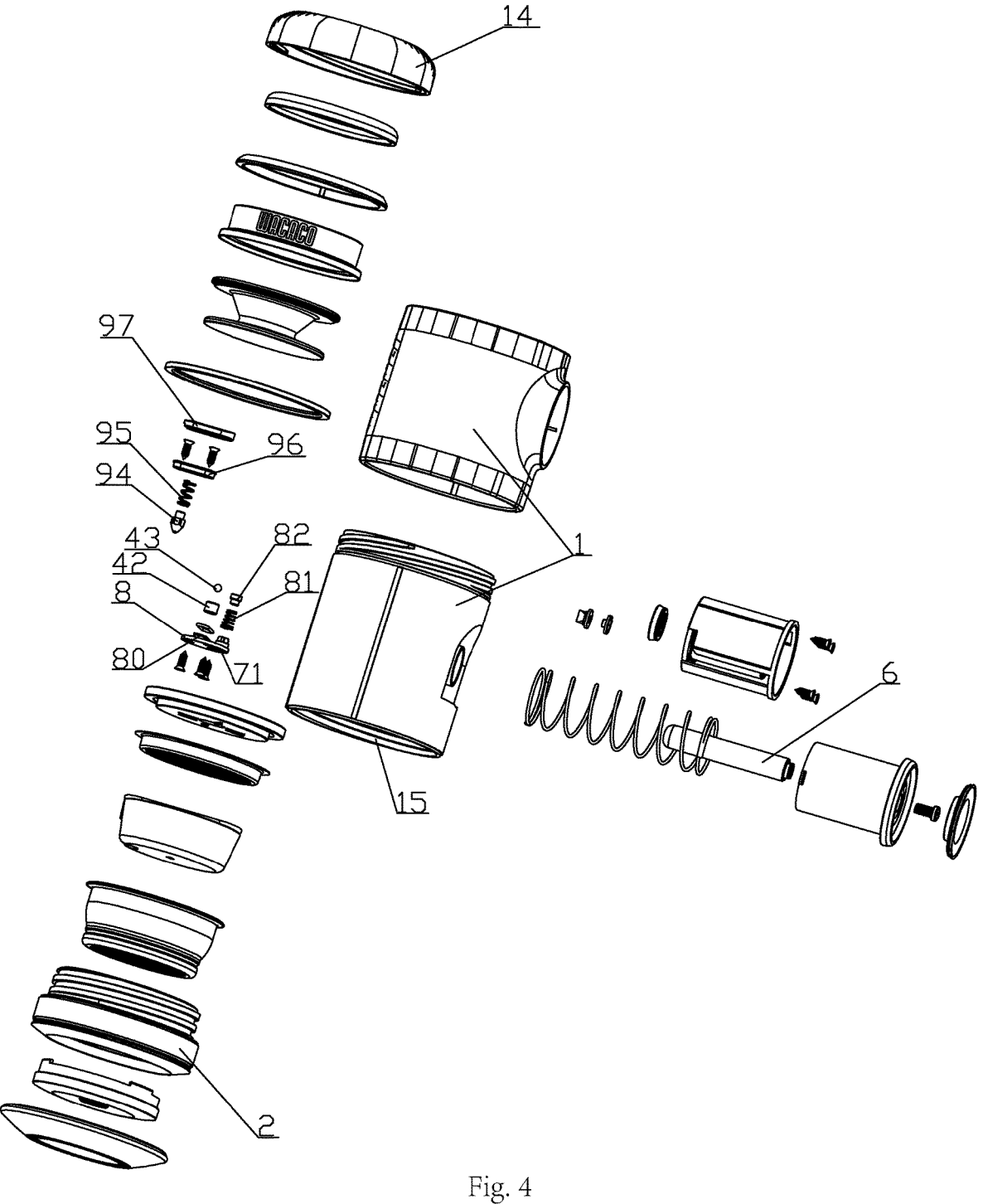
FIG. 4 is an exploded view of the invention.
Figure 5:
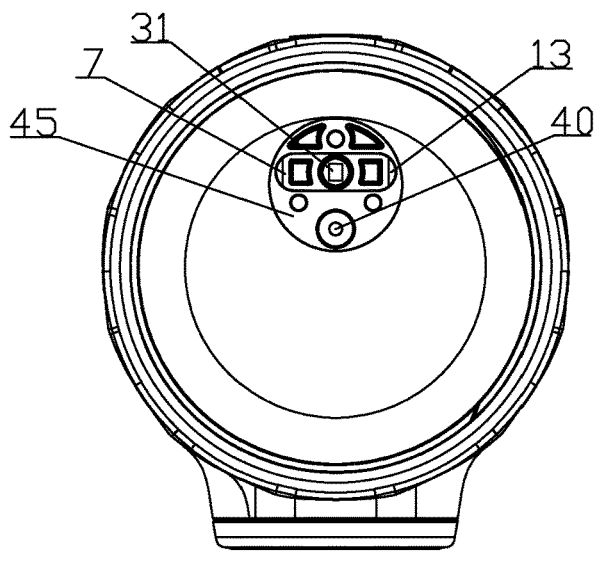
FIG. 5 is a bottom view of the cup body of the invention.
Figure 6:
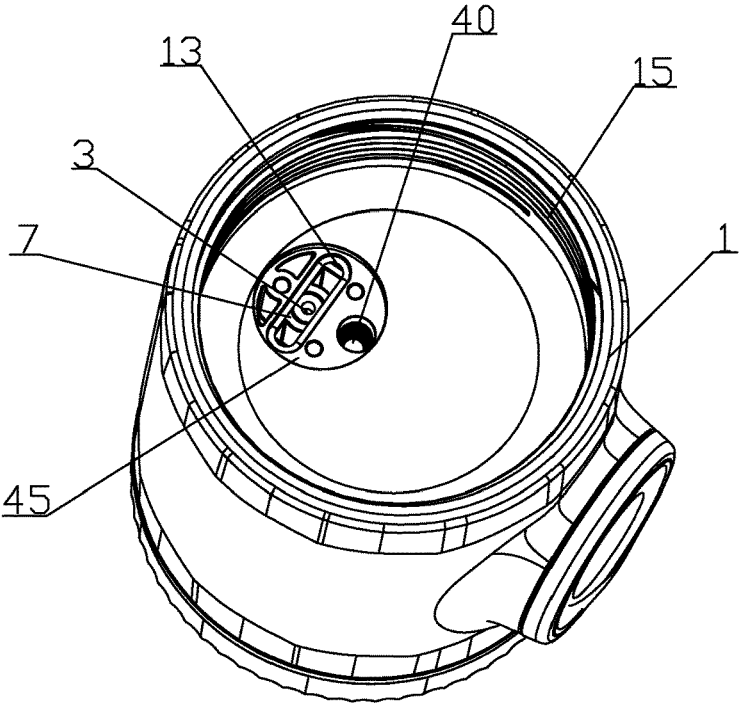
FIG. 6 is a perspective view of the components of the cup body of the invention.
Figure 7:
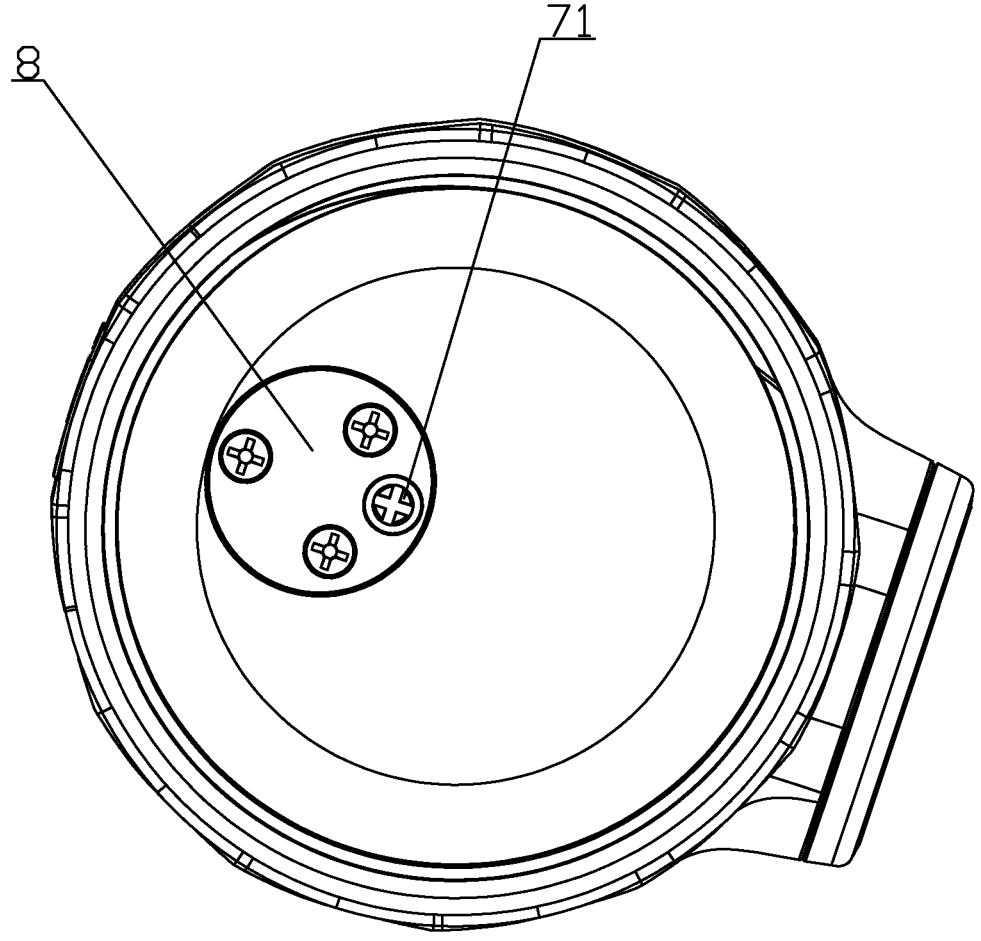
FIG. 7 is a perspective view of the installation of the cup body and the mounting cover of the invention.
Figure 8:
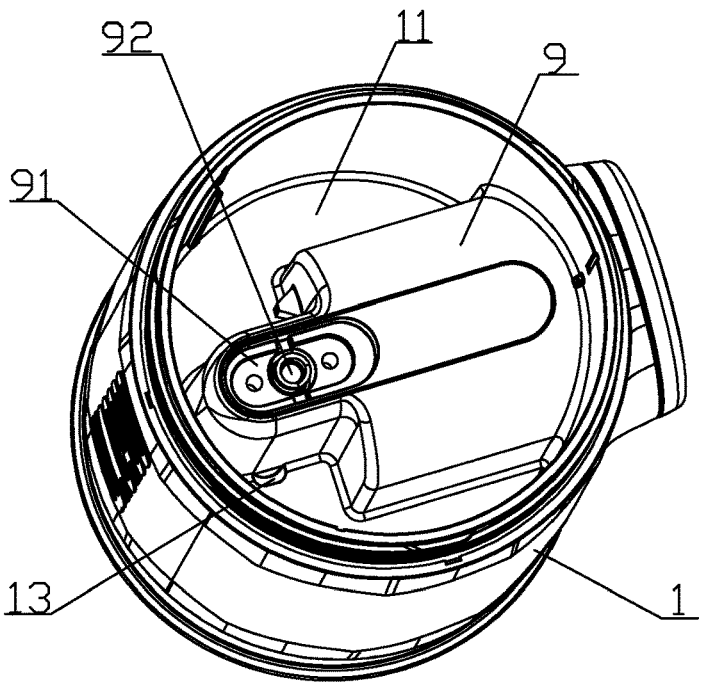
FIG. 8 is a perspective view of the cup body of the invention.
Figure 9:
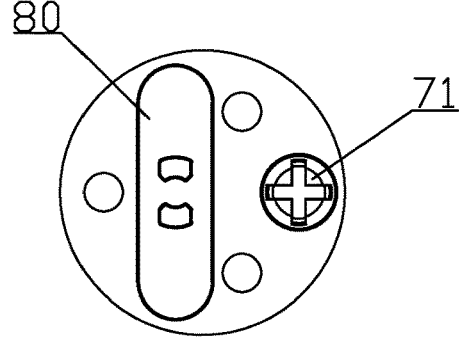
FIG. 9 is a front view of the mounting cover of the invention.

The invention will be described in further detail below in conjunction with the accompanying drawings and specific embodiments:

As shown in FIGS. 1 to 9, a small manual coffee maker, comprising a cup body 1 and a coffee brewing base 2 that are detachably connected together, a lower end of the cup body 1 is connected to the coffee brewing base 2, a water chamber 11 and a pressure chamber 12 are disposed in the cup body 1, an upper end of the cup body 1 is opened, and the water is poured into the water chamber 11 from the opening of the upper end, the cup body 1 is provided with a cup lid 14 that covers the opening of the cup body 1. A coffee brewing chamber 21 and at least a coffee outlet passage 22 are disposed in the coffee brewing base 2, coffee in the form of coffee powder, coffee powder packets, and capsule coffee can be put into the coffee brewing chamber 21, capsule coffee with filter holes can be put into the coffee brewing chamber 21, water enters from upper filter holes, and coffee flows out from lower filter holes. The cup body 1 is provided with at least a water inlet passage 3 in communication with the pressure chamber 12 and at least a water outlet passage 40 in communication with the pressure chamber 12 and the coffee brewing chamber 21, a bottom of the water chamber 11 is provided with at least a water inlet 13 that communicates with the water inlet passage 3, the height of the water inlet 13 is lower than or equal to the height of the pressure chamber 12, which means: the highest hole surface of the water inlet 13 is lower than or equal to the height of the bottom surface of the pressure chamber 12. The water inlet passage 3 is provided with a water inlet one-way valve 4 capable of controlling the one-way flow of water from the water inlet passage 3 to the pressure chamber 12, the water outlet passage 40 is provided with a water outlet one-way valve 5 capable of controlling the one-way flow of water from the pressure chamber 12 to the coffee brewing chamber 21, the cup body 1 is provided with a piston rod 6 with one end extending into the pressure chamber 12, when an end of the piston rod 6 is pulled out of the pressure chamber 12, there is negative pressure in the pressure chamber 12, when the negative pressure is large enough, the water inlet one-way valve 4 is controlled to open, so that the water flows into the pressure chamber 12 from the water inlet passage 3. When the piston rod 6 is pushed into the pressure chamber 12, pressure is formed in the pressure chamber 12, when the pressure is large enough, the water outlet one-way valve 5 is controlled to open, so that the water flows from the pressure chamber 12 to the coffee brewing chamber 21 to brew coffee. The cup body 1 with the water chamber 11 disposed therein defines a central longitudinal axis extending along a height of the cup body 1. The pressure chamber 12 and the piston rod 6 extend along a radial direction perpendicular to the central longitudinal axis. The water inlet passage 3 and the water outlet passage 40 extend parallel to the central longitudinal axis.

An lower end of the cup body 1 is provided with a connection opening 15 connected with the coffee brewing base 2, the cup body 1 is provided with a valve base 9 that separates the connection opening 15 and the water chamber 11, the pressure chamber 12, the water inlet passage 3 and the water outlet passage 40 are all disposed on the valve base 9. The valve base 9 forms a bulge in the water chamber 11, and an outer side wall of one side of the bulge and the side wall of the cup body 1 can be spaced at a certain distance for water supply. The pressure chamber 12 is disposed in an upper middle of the valve base 9, the pressure chamber 12 is opened on one side of the valve base 9 for one end of the piston rod 6 to extend into, and the water inlet passage 3 and the water outlet passage 40 are both disposed at the bottom of the valve base 9. The water inlet passage 3 and the water outlet passage 40 are both positioned below the pressure chamber 12.

The bottom end of the cup body 1 connected with the coffee brewing base 2 is provided with at least a communication groove 7 in communication with the water inlet 13 and the water inlet passage 3, a lower end of the communication groove 7 is opened, the water inlet one-way valve 4 is installed into the water inlet passage 3 from the opening at the lower end of the communication groove 7, the bottom end of the cup body 1 is provided with a mounting cover 8 that covers the opening at the lower end of the communication groove 7, the mounting cover 8 can be fixed on the bottom end of the cup body 1 by screws and other connectors. The water inlet one-way valve 4 comprises a valve body 41 disposed in the water inlet passage 3 and supported by the mounting cover 8, the valve body 41 is provided with a valve body hole 42, a water inlet valve core 43 capable of blocking the valve body hole 42 is disposed in the water inlet passage 3. One end of the water inlet passage 3 is provided with a water inlet communication hole 31 in communication with the pressure chamber 12, the water inlet valve core 43 is spherical, and the water inlet communication hole 31 is positioned above the water inlet valve core 43 and is a square hole, in this way, even if the spherical water inlet valve core 43 is sucked upward into the water inlet communication hole 31, because the water inlet communication hole 31 is square, the spherical water inlet valve core 43 still cannot block the water inlet communication hole 31, while the valve body hole 42 is circular, and the valve body hole 42 can be blocked when the spherical water inlet valve core 43 is downward. One end of the water outlet passage 40 is provided with a water outlet communication hole 44 in communication with the water chamber 11, the bottom end of the cup body 1 connected with the coffee brewing base 2 is provided with a sink 45, the water outlet passage 40 and the communication groove 7 are disposed on a bottom wall of the sink 45, the mounting cover 8 is fixed in the sink 45 by screws, the mounting cover 8 is provided with a sealing head 80 with one end extending into the communication groove 7 to seal between the communication groove 7 and the sink 45, the sealing head 80 is plugged into the communication groove 7, but the water inlet 13 and the water inlet passage 3 are kept in communication, a sealing ring can be sleeved on the sealing head 80, so that there is no communication between the communication groove 7 and the sink 45, the mounting cover 8 is provided with at least a water outlet 71 which communicates with the water outlet passage 40 and the coffee brewing chamber 21. The water outlet one-way valve 5 comprises a first elastic member 81 supported by the mounting cover 8, the mounting cover 8 is provided with a cross-shaped bump, the first elastic member 81 is sleeved on the top of the cross-shaped bump, and the water outlet 71 is disposed on the cross-shaped bump, the upper end of the first elastic member 81 is provided with a water outlet valve core 82 which can block the water outlet communication hole 44, the water outlet one-way valve 5 comprises a first elastic member 81 supported by the mounting cover 8, the upper end of the first elastic member 81 is provided with a water outlet valve core 82 capable of blocking the water outlet communication hole 44, the first elastic member 81 elastically presses the water outlet valve core 82 upward to make the water outlet valve core 82 block on the water outlet communication hole 44, when the pressure in the pressure chamber 12 is large enough, the first elastic member 81 is contracted and the water outlet communication hole 44 is opened. When the mounting cover 8 is removed, the water inlet one-way valve 4 and the water outlet one-way valve 5 can be taken out or installed, which is convenient for disassembly, cleaning and installation. At the same time, since the communication groove 7 is designed at the bottom end of the cup body 1, both the water inlet one-way valve 4 and the water outlet one-way valve 5 can be installed from the bottom end, which also facilitates the integrated design of the valve base and the cup body and simplifies the molding process.

The upper end of the valve base 9 is provided with a pressure relief groove 91, at least a pressure relief passage 92 and at least a pressure relief hole 93 which are communicated in sequence, the open end of the pressure relief groove 91 is in communication with the water chamber 11, the pressure relief hole 93 is in communication with the pressure chamber 12, the pressure relief passage 92 is provided with a pressure relief valve core 94 capable of blocking the pressure relief hole 93 and a second elastic member 95 elastically pressed on the pressure relief valve core 94, the pressure relief groove 91 is provided with a pressure relief cover 96 which presses against the second elastic member 95 and an end cover 97 which presses against the pressure relief cover 96 to cover the opening of the pressure relief groove 91, the pressure relief cover 96 is fixed by screws, the pressure relief cover 96 and the pressure relief groove 91 facilitate the installation of the pressure relief valve core 94. The elastic force of the second elastic member 95 is multiple times greater than that of the first elastic member 81, when the pressure in the pressure chamber 12 is too high and there is a potential safety hazard, the pressure relief valve core 94 will be pushed up to release the pressure.

The invention claimed is:

1. A small manual coffee maker, comprising a cup body and a coffee brewing base that are detachably connected together, a lower end of the cup body is connected to the coffee brewing base, a water chamber and a pressure chamber are disposed in the cup body, a coffee brewing chamber and at least a coffee outlet passage are disposed in the coffee brewing base, the cup body is provided with at least a water inlet passage that connects to and communicates with the pressure chamber and at least a water outlet passage that communicates with the pressure chamber and the coffee brewing chamber, the bottom of the water chamber is provided with at least a water inlet in communication with the water inlet passage, the water inlet passage is provided with a water inlet one-way valve which can control the one-way flow of water from the water inlet passage to the pressure chamber, the water outlet passage is provided with a water outlet one-way valve which can control the one-way flow of water from the pressure chamber to the coffee brewing chamber, the cup body is provided with a piston rod with one end extending into the pressure chamber;

wherein a height of the water inlet is lower than or equal to a height of the pressure chamber;

wherein the water inlet passage and the water outlet passage are located below the pressure chamber; and wherein the cup body with the water chamber disposed therein defines a central longitudinal axis extending along a height of the cup body, the pressure chamber and the piston rod extend along a radial direction perpendicular to the central longitudinal axis, and the water inlet passage and the water outlet passage extend parallel to the central longitudinal axis.

2. The small manual coffee maker according to claim 1, wherein a bottom end of the cup body connected with the coffee brewing base is provided with at least a communication groove in communication with the water inlet and the water inlet passage, a lower end of the communication groove is opened, the water inlet one-way valve is installed into the water inlet passage from an opening at the lower end of the communication groove, the bottom end of the cup body is provided with a mounting cover that covers the opening at the lower end of the communication groove.

3. The small manual coffee maker according to claim 2, wherein the water inlet one-way valve comprises a valve body disposed in the water inlet passage and supported by the mounting cover, the valve body is provided with a valve body hole, and the water inlet passage is provided with a water inlet valve core that can block the valve body hole.

4. The small manual coffee maker according to claim 3, wherein one end of the water inlet passage is provided with a water inlet communication hole in communication with the pressure chamber, the water inlet valve core is spherical, and the water inlet communication hole is positioned above the water inlet valve core and is a square hole.

5. The small manual coffee maker according to claim 2, wherein one end of the water outlet passage is provided with a water outlet communication hole in communication with the water chamber, the bottom end of the cup body connected with the coffee brewing base is provided with a sink, the water outlet passage and the communication groove are positioned on a bottom wall of the sink, the mounting cover is fixed in the sink, the mounting cover is provided with a sealing head with one end extending into the communication groove to seal between the communication groove and the sink, the mounting cover is provided with at least a water outlet in communication with the water outlet passage and the coffee brewing chamber, the water outlet one-way valve comprises a first elastic member supported by the mounting cover, an upper end of the first elastic member is provided with a water outlet valve core that can block the water outlet communication hole.

6. The small manual coffee maker according to claim 1, wherein a lower end of the cup body is provided with a connection opening connected with the coffee brewing base, the cup body is provided with a valve base that separates the connection opening and the water chamber, the pressure chamber, the water inlet passage and the water outlet passage are all disposed on the valve base.

7. The small manual coffee maker according to claim 6, wherein the valve base and the cup body are integrally formed.

8. The small manual coffee maker according to claim 6, wherein an upper end of the valve base is provided with a pressure relief groove, at least a pressure relief passage and at least a pressure relief hole which are communicated in sequence, an open end of the pressure relief groove is in communication with the water chamber, the pressure relief hole is in communication with the pressure chamber, the pressure relief passage is provided with a pressure relief valve core for blocking the pressure relief hole and a second elastic member elastically pressed on the pressure relief valve core, the pressure relief groove is provided with a pressure relief cover pressed against the second elastic member and an end cover pressed against the pressure relief cover to cover the opening of the pressure relief groove.

9. The small manual coffee maker according to claim 1, wherein an upper end of the cup body is provided with at least an opening, the cup body is provided with a cup lid that covers the opening of the cup body.

* * * * *